United States Patent
Fisher et al.

(10) Patent No.: US 10,909,539 B2
(45) Date of Patent: *Feb. 2, 2021

(54) ENHANCEMENTS TO TRANSACTION PROCESSING IN A SECURE ENVIRONMENT USING A MERCHANT COMPUTER

(71) Applicant: Visa International Service Association, San Francisco, CA (US)

(72) Inventors: Douglas Fisher, Mountain View, CA (US); Karl Newland, Pacifica, CA (US); Patrick Wright, Mountain View, CA (US); Kevin Wong, Sausalito, CA (US); Christopher Brownlee, Alameda, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 14/527,652

(22) Filed: Oct. 29, 2014

(65) Prior Publication Data

US 2015/0120560 A1 Apr. 30, 2015

Related U.S. Application Data

(60) Provisional application No. 61/897,167, filed on Oct. 29, 2013, provisional application No. 61/936,298, filed on Feb. 5, 2014.

(51) Int. Cl.
*G06Q 20/40* (2012.01)
*G06Q 20/34* (2012.01)
(Continued)

(52) U.S. Cl.
CPC ......... *G06Q 20/4016* (2013.01); *G06F 21/44* (2013.01); *G06Q 20/12* (2013.01);
(Continued)

(58) Field of Classification Search
CPC .... G06Q 20/3221; G06Q 30/00; G06Q 20/42; G06Q 20/3552; G06Q 20/40;
(Continued)

(56) References Cited

U.S. PATENT DOCUMENTS 5,336,870 A * 8/1994 Hughes ............... G06Q 20/04
235/379
7,430,520 B1 * 9/2008 Haugen ............... G06Q 30/02
235/375

(Continued)

OTHER PUBLICATIONS

U.S. Appl. No. 14/527,647, filed Oct. 29, 2014 by Fisher et al.
(Continued)

*Primary Examiner* — Johann Y Choo
(74) *Attorney, Agent, or Firm* — Kilpatrick Townsend & Stockton LLP

(57) ABSTRACT

Embodiments of the present invention are directed to methods, systems, and apparatuses for performing a secure authentication process to authenticate a payment device used in a transaction between a merchant and a user. The secure authentication process may receive an authentication request message including user data, user computing device data and transaction data to verify that an account is enrolled in the secure authentication process and perform a risk analysis to determine whether the transaction should be authenticated.

11 Claims, 3 Drawing Sheets

(51) Int. Cl.
  *G06Q 20/12* (2012.01)
  *G06Q 20/32* (2012.01)
  *G06Q 20/42* (2012.01)
  *G06F 21/44* (2013.01)

(52) U.S. Cl.
  CPC ......... *G06Q 20/3224* (2013.01); *G06Q 20/34* (2013.01); *G06Q 20/405* (2013.01); *G06Q 20/4012* (2013.01); *G06Q 20/4014* (2013.01); *G06Q 20/40145* (2013.01); *G06Q 20/425* (2013.01)

(58) Field of Classification Search
  CPC ............. G06Q 10/0835; G06Q 40/025; G06Q 20/3224; G06Q 30/0269; G06Q 30/0275; G06Q 20/4014; G06Q 20/409; G06Q 20/3276; G06Q 20/3825; G06Q 30/0609; G06F 21/44; G06F 21/6227; G06F 17/30598; G06F 15/177
  See application file for complete search history.

(56) References Cited

U.S. PATENT DOCUMENTS

| | | | |
|---|---|---|---|
| 7,600,676 B1 * | 10/2009 | Rados | G06Q 20/40 235/380 |
| 7,653,602 B2 | 1/2010 | Davis | |
| 8,313,022 B2 | 11/2012 | Hammad et al. | |
| 8,533,118 B2 | 9/2013 | Weller et al. | |
| 8,762,279 B2 | 6/2014 | Weller et al. | |
| 2003/0004876 A1 * | 1/2003 | Jacobson | G06Q 20/105 705/41 |
| 2003/0105707 A1 * | 6/2003 | Audebert | G06Q 40/02 705/38 |
| 2003/0126076 A1 * | 7/2003 | Kwok | G06Q 20/04 705/40 |
| 2003/0130919 A1 * | 7/2003 | Templeton | G06Q 20/10 705/35 |
| 2006/0006226 A1 * | 1/2006 | Fitzgerald | G06Q 20/10 235/380 |
| 2010/0023437 A1 | 1/2010 | Davis | |
| 2010/0057619 A1 | 3/2010 | Weller et al. | |
| 2011/0270694 A1 * | 11/2011 | Halim | G06Q 20/204 705/18 |
| 2012/0018506 A1 | 1/2012 | Hammad et al. | |
| 2012/0292388 A1 * | 11/2012 | Hernandez | G06Q 20/108 235/379 |
| 2013/0144888 A1 | 6/2013 | Faith et al. | |
| 2014/0114857 A1 * | 4/2014 | Griggs | G06Q 20/20 705/44 |
| 2014/0244511 A1 | 8/2014 | Weller et al. | |
| 2014/0358789 A1 * | 12/2014 | Boding | G06Q 20/4016 705/44 |
| 2015/0120559 A1 | 4/2015 | Fisher et al. | |
| 2016/0232520 A9 * | 8/2016 | Singhal | G06Q 20/02 |

OTHER PUBLICATIONS

U.S. Appl. No. 14/527,647, "Final Office Action", dated Nov. 22, 2017, 19 pages.
U.S. Appl. No. 14/527,647, "Non-Final Office Action", dated Jun. 5, 2017, 18 pages.
U.S. Appl. No. 14/527,647, "Non-Final Office Action", dated Nov. 1, 2018, 18 pages.
U.S. Appl. No. 14/527,647, "Final Office Action", dated Mar. 13, 2019, 16 pages.

* cited by examiner

ENHANCEMENTS TO TRANSACTION PROCESSING IN A SECURE ENVIRONMENT USING A MERCHANT COMPUTER

CROSS-REFERENCES TO RELATED APPLICATIONS

This application claims the benefit of priority U.S. Provisional Application No. 61/897,167, filed Oct. 29, 2013, titled "ENHANCEMENTS TO TRANSACTION PROCESSING IN A SECURE ENVIRONMENT," and U.S. Provisional Application No. 61/936,298, filed Feb. 5, 2014, titled "ENHANCED DEVICE DATA FOR PROCESSING IN A SECURE ENVIRONMENT," which are incorporated by reference in their entirety for all purposes.

This application is related to co-pending U.S. patent application Ser. No. 14/527,647, filed Oct. 29, 2017, which is being filed on the same day as the present application, titled "ENHANCEMENTS TO TRANSACTION PROCESSING IN A SECURE ENVIRONMENT".

BACKGROUND

The Internet has made it increasingly easy for users to conduct electronic commerce transactions (e.g., online purchases). Users can perform transactions using computing devices, such as smartphones, tablet computers, and personal computers, without having to interact with another person. However, it has also increased the risks to merchants and issuers from fraudulent transactions. Transactions conducted over a communications network, such as the Internet, make it very difficult for a merchant, issuer or payment processing network to know whether the person conducting the transaction is the actual account holder or user.

One solution is to have the user to enroll in an authentication scheme through a secure environment that requires the user to provide a password when conducting a transaction. When the user conducts a transaction, typical transaction processing in the secure environment is a multi-stage process, as described in U.S. patent application Ser. No. 12/419,115. This process may require: (1) a first pair of data messages for an enrollment verification process to determine whether a user is enrolled in the authentication process, and (2) a second pair of data messages for a payment authentication process to authenticate the payment device used in the transaction. Each stage is conducted using separate pairs of request and response data messages.

One problem with the prior solution is that the process of sending and receiving enrollment verification messages and then conducting a second process of sending and receiving payment authentication messages may be time-consuming and resource-consuming as it requires many messages being passed between computers. In addition, the prior art solution creates friction that slows down transaction processing as every transaction must include a challenge process that requires user interaction to provide a password to authenticate every transaction.

Embodiments of the invention address the above problems, and other problems, individually and collectively.

BRIEF SUMMARY

Embodiments of the invention are directed to methods, systems, and apparatuses for performing authentications for transactions using a single message pair sent to a secure authentication program by a merchant computer associated with a transaction between a user and a merchant. An access control server computer may be configured to receive an authentication request message including user data, user computing data and transaction data. The access control server computer may be further configured to verify the enrollment of an account in a secure authentication program, perform a risk analysis to determine whether the transaction should be authenticated, and return an authentication response message to the merchant computer while requiring only limited action or no action by the user associated with the user computing device.

One embodiment of the invention is directed to a method comprising, receiving an authentication request message generated by a merchant computer for a payment device used in a transaction between a user and a merchant. The authentication request message may include user data, user computing device data associated with a user computing device, and transaction data. The method further comprises determining if authentication is available for the transaction by determining whether the payment device is enrolled in a secure authentication program. When authentication is available for the payment device, a risk analysis is performed using the user data, the user computing device data, and the transaction data received in the authentication request message to compute a risk score. When the risk score determined from the risk analysis is on a first side of a threshold, the method further comprises initiating generating a verification value associated with the payment device, and initiating provisioning the verification value to the user computing device in an authentication response message. When the risk score determined from the risk analysis is on a second side of the threshold, the method further comprises initiating generating and sending the authentication response message to the merchant computer indicating a challenge process is required, initiating generating and sending a challenge request message, and provisioning the verification value to the merchant computer in the authentication response message, after the challenge request message is generated and sent.

Another embodiment of invention is directed to a access server computer comprising a processor and a computer readable medium coupled to the processor, the computer readable medium comprising code, executable by the processor for implementing a method. The method comprises receiving an authentication request message generated by a merchant computer for a payment device used in a transaction between a user and a merchant. The authentication request message may include user data, user computing device data associated with a user computing device, and transaction data. The method further comprises determining if authentication is available for the transaction by determining whether the payment device is enrolled in a secure authentication program. When authentication is available for the payment device, a risk analysis is performed using the user data, the user computing device data, and the transaction data received in the authentication request message to compute a risk score. When the risk score determined from the risk analysis is on a first side of a threshold, the method further comprises initiating generating a verification value associated with the payment device, and initiating provisioning the verification value to the user computing device in an authentication response message. When the risk score determined from the risk analysis is on a second side of the threshold, the method further comprises initiating generating and sending the authentication response message to the merchant computer indicating a challenge process is required, initiating generating and sending a challenge request message, and provisioning the verification value to the merchant computer in the authentication response message, after the challenge request message is generated and sent.

These and other embodiments of the invention are described in further detail below with reference to the Drawings and the Detailed Description.

DETAILED DESCRIPTION

Figure 1:
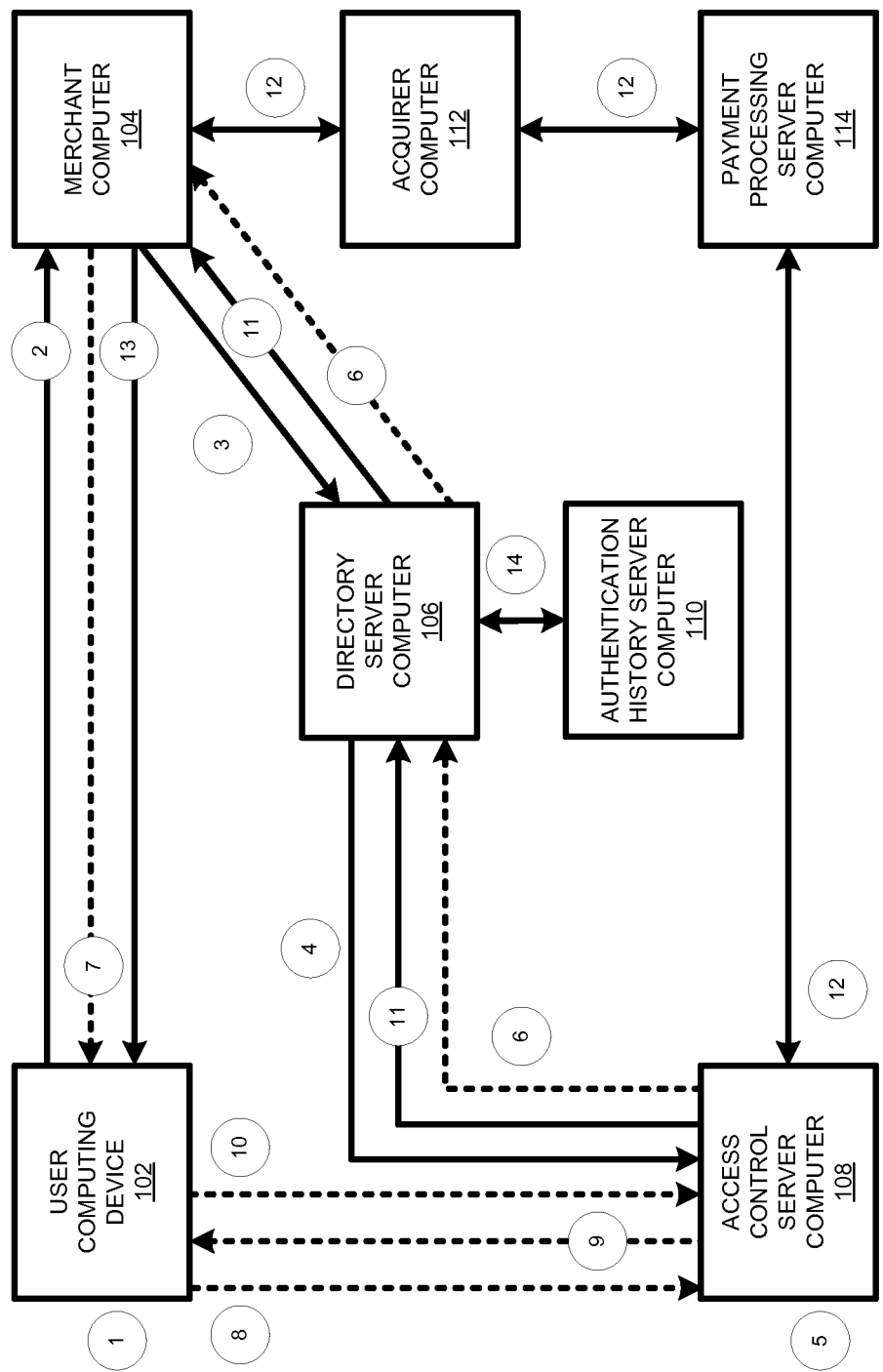
FIG. 1 shows a transaction processing system along with a flow diagram of a process that can be used with the transaction processing system according to an embodiment of the present invention.

Embodiments of the present invention may be directed at enhancing the process of verifying and authenticating payment devices used in financial transactions between a user and a merchant. Embodiments of the present invention may use an existing secure environment (e.g., 3-D Secure® or Verified by Visa®) in order to conduct an enrollment verification and authentication in a single message pair process. The single message pair process may include user data, transaction data, and user computing device data to verify enrollment of a payment device in the secure authentication program, as well as part of a risk analysis to determine a risk level associated with the transaction. Low risk levels may result in the generation of a verification value (e.g., cardholder authentication verification value or CAVV) for the transaction, while high risk levels may result in a request for additional authentication processes (e.g., secure data elements, passwords or challenge questions).

Prior to discussing embodiments of the invention, descriptions of some terms may be helpful in providing a better understanding of the invention.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds.

An "authentication request message" may include a message sent as part of an authentication process. The authentication request message may request an authentication process be performed for a user, a user computing device, or a payment device.

An "authentication response message" may include a message sent as part of an authentication process in response to an authentication request message. An authentication response message may include the results of an authentication process based on data received in the authentication request message.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

The term "account identifier" may include any information that may be used to identify an account. For example, the account identifier may be an account number associated with a financial account (e.g., a credit card number or debit card number) or a non-financial account, or may be a special identifier generated randomly or according to a predetermined algorithm, code, or shared secret. The account identifier for a financial account may be generated by an issuer associated with the financial account. The account identifier may also be embedded in a payment device, such as in a magnetic stripe portion or a contact/contactless chip of a payment device in the form of a payment card. In other embodiments, the account identifier may be stored in a memory component of a user computing device for identifying the financial account associated with the account identifier. In some embodiments, the account identifier may be based on user or consumer data. In some embodiments, the account identifier may include a series of alphanumeric characters, one or more graphics, a token, a bar code, a QR code, or any other information that may be associated with an account.

The term "initiating" may include the first steps taken in order to begin a process or the steps conducted in order to complete a process. For example, "initiating generating a verification value" can refer to the actual process required to generate the verification value. However, "initiating generating a verification value" can also refer to the process of sending a message from one computer to another computer, with instructions for performing the process required to generate the verification value.

The term "authorization process" may include a process for authorizing a transaction. In some embodiments, an authorization process involves a payment processing server computer and an issuer computer associated with a payment account or payment device. In some embodiments, the authorization process may involve the generation and sending of authorization request messages to an issuer computer to authorize a financial transaction involving a user account issued by the issuer associated with the issuer computer, and an authorization response message from the issuer computer indicating an authorization or rejection of the transaction.

A "risk analysis" may include a process for determining a risk level. The risk analysis may use data to calculate or determine a level of risk associated with a transaction. The risk analysis may use data received in an authentication request message for a transaction to determine a risk score for the transaction.

A "risk score" may include results of a risk analysis or evaluation. A risk score may be in the form of a numeric or an alphanumeric value, such as a number from 1-10 or a letter from A-Z. A risk score may indicate a relative degree of risk in a particular situation, such as a transaction. In some cases, a high risk score may indicate high risk, while a low risk score may indicate low risk.

The term "user" may refer to an individual or entity. The user may be an individual interacting with a user computing device (e.g., a mobile phone or tablet). The user may be a consumer or business that is associated with a financial account and whose financial account can be used to conduct financial transactions using a payment device associated with the financial account.

A "user computing device" may include a device that can be used to communicate with another device or system. It can include a consumer or user device that is used to conduct a transaction. The user computing device may be capable of conducting communications over a network. A user computing device may be in any suitable form. For example, suitable user computing devices can be hand-held and compact so that it can fit into a user's wallet and/or pocket (e.g., pocket-sized). The user computing device can include a processor, and memory, input devices, and output devices, operatively coupled to the processor. Specific examples of user computing devices include cellular or mobile phones, tablet computers, desktop computers personal digital assistants (PDAs), pagers, portable computers, smart cards, and the like.

A "payment device" may include a device that can be used to perform a payment transaction. Payment device may be linked to a financial account associated with the holder of the payment device, and may be useable to provide payment information for a transaction. Payment devices can include debit devices (e.g., a debit card), credit devices (e.g., a credit card), or stored value devices (e.g., a pre-paid or stored value cards). Payment devices can also include mobile phones, tablet computers, personal digital assistants (PDAs), portable computers, smart cards, and the like. Other payment devices may include non-physical forms of payment (e.g., virtual wallets, virtual accounts).

A "verification value" may include a value that may be used for establishing the authenticity of a user, an account and/or payment device. In some embodiments, the verification value may be a value or a token provided in response to a successful authentication. An example of a verification value is a cardholder authentication verification value, or CAVV, that may be provided by an issuer associated with a payment device upon authentication of the payment device. The verification value may be used in processing a payment authorization for a financial transaction.

The term "user computing device data" may include data associated with a user computing device. User computing device data may refer to data regarding a portable computing device, such as a computer or mobile phone. Examples of user computing device data may include unique device identifiers for a computer or mobile phone, an IP address, SIM card data, application data, mobile application data, browser data, and device make and model data. User computing device data may also include the device's MSISDN, or Mobile Subscriber Integrated Services Digital Network-Number, which is a number that uniquely identifies a subscription in a mobile network.

The term "user data" may include data that regarding a user or a consumer. User data may include a name, mailing address, shipping address, phone number, payment account number, date of birth, marital status, income, social security number, demographic data, etc. In some embodiments, user data may also include consumer preferences, notification methods, and prior transaction history.

The term "transaction data" may include data that regarding a transaction. Transaction data may include data for a specific transaction, including items purchased, item prices, total cost, shipping address, payment methods, merchant data, etc. In some embodiments, transaction data may be generated when the user or consumer attempts to initiate a transaction for processing. In other embodiments, transaction data may be generated and sent based on items added to a consumer's shopping cart.

The term "challenge process" may include a process for challenging a user. In some embodiments, the challenge process may involve the generation and sending of challenge request messages to a user computing device requesting the user to provide a response to a challenge question or query, and an challenge response message from the user computing to the access control server computer indicating a response to the challenge in the challenge request message.

A "challenge request message" may include a message sent as part of an authentication process for a transaction. In some embodiments, the challenge request message may contain a request for the user to submit a pre-established secure data element in order to authenticate an account or payment device. The challenge request message may be generated and sent prior to authenticating the account or payment device.

A "challenge response message" may include a message sent as part of an authentication process for a transaction. In some embodiments, the challenge response message may be transmitted from a user computing device to an access control server computer or a directory server computer. The challenge response message may contain a response from the user computing device to the challenge request message comprising a pre-established secure data element in order to authenticate an account or payment device.

A "challenge result message" may include a message sent as part of an authentication process for a transaction. In some embodiments, the challenge result message may contain an indication of the result of a challenge process. The challenge result message may be generated and sent prior to indicate a successful or unsuccessful authentication for an account or payment device.

The term "secure data element" may include a unique expression that uniquely identifies a user. The secure data element may be created by the user in an enrollment process. In other embodiments, the secure data element may be created by a computer on behalf of the user. The secure data element may be alphanumeric, or composed of only numbers or only letters. Secure data element are not limited to strings of characters. In some embodiments, a secure data element may be a password, a token, or biometric data (e.g., fingerprint, voiceprint). Other examples of secure data elements include a personal identification number (PIN) and a unique visual image or pattern.

An "application" may include a computer program. An application may be a computer program stored and/or operating on a user computing device (e.g., a computer, mobile device). An application may be used to perform financial transactions (e.g., purchase transactions) and/or non-financial transactions (e.g., using a mobile application for age or identity verification).

The term "enrolled" may refer to a registration status of a user or an account with respect to a pre-existing program. In some embodiments, in order for an account or user computing device to be authenticated by a secure authentication program, a user and/or the account is enrolled in the secure authentication program. In some embodiments, in order to be enrolled in the secure authentication program, the user may have to complete an enrollment process. In some embodiments, enrollment in the secure authentication program may be automatic.

The term "secure authentication program" may include a computer-implemented program for performing authentication processes. The secure authentication program may be performed by a directory server computer and/or an access control server computer on behalf of an issuer and/or payment processor. The secure authentication program may require enrollment of an account or user in order to provide secure authentication processes for transactions.

A "threshold" may refer to a boundary value. A value compared to the value of the threshold may be used to determine an action to perform. A threshold may be a numerical value in which values below the threshold result in the performance of a first set of actions, and values above the threshold result in the performance of a second set of actions. In some embodiments, the threshold may be a pre-established value.

The term "direct connection" may refer to a connection between two computing devices that does not have a major data processing computer such as a directory server computer, merchant computer, acquirer computer, or payment processing server computer between them. In some embodiments, a direct connection may be a direct wired or wireless communications (e.g., across a network, such as the Internet) connection between two or more computers.

A "bank identification number" may be a sequence identifying a financial institution. The bank identification number, or BIN, may include a number of digits of a debit card number, credit card number and/or an account number. The BIN may be used to identify the financial institution (e.g., bank, financial services corporation) associated with the debit card, credit card or account.

The term "merchant computer" may include a computer associated with a merchant. Examples of merchant computers may include an access device, point of sale terminal, or a web server computer hosting a merchant Internet website. The merchant computer may be in any suitable form. Additional examples of merchant computers include any device capable of accessing the Internet, such as a personal computer, cellular or wireless phones, personal digital assistants (PDAs), tablet PCs, and handheld specialized readers.

The term "issuer computer" may include a computer associated with an entity that issues an account. An issuer is typically a business entity (e.g. a bank) which maintains financial accounts for a plurality of users (e.g., consumers) and issues payment devices (e.g., credit cards, debit cards). Some entities can perform both issuer computer and acquirer computer functions. Embodiments of the invention encompass such single entity issuer-acquirers.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "directory server computer" may include a server that can perform message routing. In some embodiments, the directory server computer may be capable of receiving messages (e.g., authentication request messages and authentication response), determining the appropriate destination computer for the received messages, and routing the received messages to the appropriate destination computer. In some embodiments, the directory server computer may include or be associated with a database containing routing tables that may be used to determine an appropriate issuer computer associated with an account identifier (e.g., a bank identification number). In some embodiments, the directory server computer may be further configured to perform an enrollment verification process for the account identifier and a risk analysis process.

An "access control server computer" may be a computer or system that is configured to provide authentication and/or verification services. The access control server computer may provide authentication services for both financial and non-financial (e.g., access) transactions. In some embodiments, the access control server computer may be associated with an issuer computer. In other embodiments, the access control server computer may be associated with a payment processing server computer.

The term "payment processing server computer" may include a server computer used for payment processing. In some embodiments, the payment processing server computer may be coupled to a database and may include any hardware, software, other logic, or combination of the preceding for servicing the requests from one or more client computers. The payment processing server computer may comprise one or more computational apparatuses and may use any of a variety of computing structures, arrangements, and compilations for servicing the requests from one or more client computers. In some embodiments, the payment processing server computer may operate multiple server computers. In such embodiments, each server computer may be configured to process transaction for a given region or handles transactions of a specific type based on transaction data.

The payment processing server computer may include data processing subsystems, networks, and operations used to support and deliver authorization services, exception file services, and clearing and settlement services. An exemplary payment processing server computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing server computer may use any suitable wired or wireless network, including the Internet.

The payment processing server computer may process transaction-related messages (e.g., authorization request messages and authorization response messages) and determine the appropriate destination computer (e.g., issuer computer) for the transaction-related messages. In some embodiments, the payment processing server computer may authorize transactions on behalf of an issuer. The payment processing server computer may also handle and/or facilitate the clearing and settlement of financial transactions.

I. Exemplary System

FIG. 1 shows a transaction processing system 100 along with a flow diagram of a process that can be used with the transaction processing system 100 according to an embodiment of the present invention. The system 100 may be used to facilitate data communications between the various computers depicted in FIG. 1 for authentication and/or authorizing financial and non-financial transactions. The system 100 includes a user computing device 102, a merchant computer 104, a directory server computer 106, an access control server computer 108, an authentication history server computer 110, an acquirer computer 112, and a payment processing server computer 114. Each of these systems and computers may be in operative communication with each other via any suitable communication medium, including the Internet, using any suitable communications protocols.

For simplicity of illustration, a certain number of components are shown in FIG. 1. It is understood, however, that embodiments of the present invention may include fewer than or greater than all of the components shown in FIG. 1. In addition, some embodiments may include more than one of each component.

The user computing device 102 may be in any suitable form. For example, suitable user computing devices 102 may be hand-held and compact so that they can fit into a user's pocket. Examples of user computing devices 102 may include any device capable of accessing the Internet. Specific examples of user computing devices 102 include cellular or wireless phones (e.g., smartphones), tablet phones, tablet computers, laptop computers, desktop computers, personal digital assistants (PDAs), pagers, portable computers, smart cards, and the like.

The user computing device 102 may include a processor, memory, input/output devices, and a computer readable medium coupled to the processor. The computer readable medium may comprise code, executable by the processor for performing the functionality described below. The user computing device 102 may include a browser and/or applications (e.g., mobile applications, computer programs) stored in the memory and configured to retrieve, present, and send data across a communications network (e.g., the Internet).

The user computing device 102 may be configured to send data to any suitable entity as part of a transaction. The data may include user computing device data, user data and transaction data. The data may also include payment device data, geolocation data, user address, user email address, user phone number, account data, or other comparable data. In some embodiments, a mobile application used in the transaction may determine the data that is sent to a merchant computer 104 for inclusion in an authentication request message for a transaction.

The merchant computer 104 may be comprised of various modules that may be embodied by computer code, residing on computer readable media. The merchant computer 104 may include a processor and a computer readable medium coupled to the processor, the computer readable medium comprising code, executable by the processor for performing the functionality described below. Examples of merchant computer 104 may include an access device, a point of sale terminal, or a server computer hosting a merchant Internet website. The merchant computer 104 may be in any suitable form. Additional examples of merchant computers include any device capable of accessing the Internet, such as a personal computer, cellular or wireless phones, personal digital assistants (PDAs), tablet computers, and handheld specialized readers.

In some embodiments, the merchant computer 104 may generate an authentication request message for a transaction involving a user and the merchant associated with the merchant computer 104. In some embodiments, the merchant computer 104 may generate the authentication request message using transaction data received from a mobile application stored on a user computing device 102. In some embodiments, the authentication request message may be sent by the merchant computer 104 to the directory server computer 106 for sending to the access control server computer 108. In some embodiments, the data that is sent in the authentication request message may be based on a merchant category code (MCC) for the merchant in the transaction. For example, if the merchant is a hotel, the number of nights being reserved may be specifically sent as part of the transaction data sent to the access control server computer 108. In other embodiments, the data sent in the authentication request message to the access control server computer 108 may be dynamically determined based on the transaction data, the user data, and the user computing device data.

In some embodiments, the merchant computer 104 may transmit data through a communications medium to an acquirer computer 112 as part of an authorization process for a transaction. In some embodiments of the invention, the merchant computer 104 may receive transaction data from a user computing device 102 and transmits the transaction data to the acquirer computer 112 for transaction-related processes (e.g., authorization) in an authorization request message. In such embodiments, the authorization request message may include a verification value generated in the secure authentication process by the access control server computer 108 and sent to the merchant computer 104.

The directory server computer 106 may be a server computer configured to route messages. In some embodiments, the directory server computer 106 may route authentication request and response messages between the merchant computer 104 and the access control server computer 108 as part of a financial or non-financial transaction. In some embodiments, the directory server computer 106 may route messages between the user computing device 102 and the access control server computer 108 related to a challenge process for authenticating a payment device used in a transaction. In some embodiments, the directory server computer 106 may be operated by a payment processing server computer 114.

In some embodiments, the directory server computer 106 may be configured to perform an enrollment verification process on behalf of the access control server computer 108. In such embodiments, the directory server computer 106 may store data regarding accounts or account identifiers that are enrolled in the secure authentication program.

In some embodiments, the directory server computer 106 may be further configured to perform a risk analysis using user data, user computing device data and/or transaction data received in the authentication request message for a transaction from the user computing device 102. In such embodiments, the directory server computer 106 may determine a risk score for the transaction and send the risk score to the access control server computer 108 for additional authentication processing.

In some embodiments, the directory server computer 106 may be configured to conduct a challenge process with the user computing device 102. In such embodiments, the directory server computer 106 may generate a challenge request message requesting a user provide a pre-established secure data element (e.g., password, token, biometric data) in order to authenticate the transaction and/or the payment device. In such embodiments, the directory server computer 106 may evaluate the secure data element received in a challenge response message and determine whether the received secure data element matches a stored secure data element.

The access control server computer 108 may comprise a server computer that may be configured to conduct authentication and authorization processes. The access control server computer 108 may be associated with an issuer, which can be an entity (e.g., bank, financial institution) that issues and maintains financial accounts for a user. The access control server computer 108 may authenticate a transaction using an account identifier (e.g., account number) associated with the user. The access control server computer 108 may use user data, user computing device data and/or transaction data, PAN, payment device data, geolocation data, account data, or other comparable data, in order to perform an authentication for the transaction. In some embodiments, at the time of a transaction, the access control server computer 108 may perform the authentication, and may provide digitally signed responses to the merchant computer 104 through the directory server computer 106.

In some embodiments, the access control server computer 108 may be configured to perform a risk analysis using user data, user computing device data and/or transaction data received in the authentication request message for a transaction from the merchant computer 104. As noted above, the authentication request message may include payment device data, geolocation data, account data, or other similar data related to financial transactions. In some embodiments, the authentication request message may include non-financial transaction-related data, including browser data, mobile application data, etc. The access control server computer 108 may use this data to determine a risk score associated with a payment device or account that is being used for a transaction.

The access control server computer 108 may be configured to return an authentication response message. The authentication response message may be based on the risk analysis conducted by the access control server computer 108 or the directory server computer 106. The authentication response message may provide an indication to the merchant computer 104 that the account or payment device has been authenticated or not authenticated.

In some embodiments, when the risk score associated with the payment device or account is on one side of a pre-defined or user-defined risk threshold (e.g., below a threshold), the access control server computer 108 may provide an indication in the authentication response message that the account or payment device has been authenticated and that the transaction may proceed. For example, given a risk analysis where the risk score is within a range from 0-10, with 10 being the highest likelihood of fraud and 0 being the lowest likelihood of fraud, a risk score of 5 may be established as a risk threshold. In such an example, transactions with risk scores of 0-4 may be considered low risk, while transactions with risk scores of 5-10 may be considered higher risk and subject to additional authentication processes.

In some embodiments, when the risk score associated with the payment device or account is on another side of the pre-defined or user-defined risk threshold (e.g., above the threshold), the access control server computer 108 may provide an indication in the authentication response message that the account or payment device has not been authenticated and that the transaction may not proceed. In such embodiments, the access control server computer 108 may be further configured to conduct additional authentication processes using a challenge process with the user computing device 102. In such embodiments, the access control server computer 108 may generate a challenge request message requesting a user provide a pre-established secure data element (e.g., password, token, biometric data) in order to authenticate the transaction and/or the payment device. In such embodiments, the access control server computer 108 may evaluate the secure data element received in a challenge response message and determine whether the received secure data element matches a stored secure data element. In some embodiments, the challenge process may be conducted through a direct connection between the access control server computer 108 and the user computing device 102. In other embodiments, the challenge process may be conducted between the user computing device 102 and the access control server computer 108 through a directory server computer 106.

In some embodiments, where the challenge process is required, the access control server computer 108 may generate the authentication response message to indicate that the challenge process is required. For example, the authentication response message may have a PAN Authentication Available data field set to "C" to indicate the challenge process is required. In some embodiments, the access control server computer 108 may further be configured to generate a challenge result message after the challenge process has been completed, to indicate the result of the challenge process. Where the challenge process was successful, the challenge result message may include the generated verification value. Where the challenge process was unsuccessful, the challenge result message may indicate a failed authentication, request additional authentication data, and/or recommend the transaction be denied.

As noted above, the enrollment verification process and the risk analysis process of the secure authentication process may be performed by either the directory server computer 106, the access control server computer 108, or a combination of the two computers.

During an authorization process for a transaction, the access control server computer 108 may generate authorization response messages for authorizing or rejecting a user's account or payment device for payment for a requested transaction and provide digitally signed receipts to merchants. In some embodiments, the access control server computer 108 may be operated by an issuer. In other embodiments, a payment processing server computer 114 may operate the access control server computer 108 on behalf of the issuer.

The authentication history server computer 110 may be a database connected to the directory server computer 106 that can be accessed as part of the authentication process. For example, the authentication history server computer 110 may store user authentication data associated with user computing devices, payment devices or account numbers. The authentication history server computer 110 may further store user computing device authentication data for user enrolled in account authentication services. In some embodiments, the directory server computer 106 may query the authentication history server computer 110 as part of an authentication process. In some embodiments, after an authentication process has been completed, data related to the authentication process, including an indication of whether the authentication process was completed successfully or unsuccessfully, may be stored in the authentication history server computer 110.

The acquirer computer 112 is typically a system associated with an entity (e.g., a bank) that has a business relationship with a particular merchant or other entity. The acquirer computer 112 may include a processor and a computer readable medium coupled to the processor, the computer readable medium comprising code, executable by the processor for performing the functionality described below. The acquirer computer 112 may be configured to route transaction authorization messages between the merchant computer 104 and the payment processing server computer 114.

The payment processing server computer 114 may comprise a server computer comprising a processor and computer readable medium coupled to the processor, the computer readable medium comprising code, executable by the processor for performing the functionality described below.

In some embodiments, the server computer may be coupled to a database and may include any hardware, software, other logic, or combination of the preceding for servicing the requests from one or more client computers.

The payment processing server computer 114 may include data processing subsystems, networks, and operations used to support and deliver authorization services, exception file services, and clearing and settlement services. An exemplary payment processing server computer 114 may include VisaNet™. Networks that include VisaNet™ are able to process credit card transactions, debit card transactions, and other types of commercial transactions. VisaNet™, in particular, includes an integrated payments system that processes authorization requests and a Base II system that performs clearing and settlement services. The payment processing server computer 114 may use any suitable wired or wireless network, including the Internet.

II. Exemplary Methods

FIG. 1 shows a transaction processing system 100 along with a flow diagram of a process that can be used with the transaction processing system 100 according to an embodiment of the present invention.

In step 1, a user initiates a transaction. In some embodiments, the user may access a mobile application stored on the user computing device 102 in order to initiate a transaction. The mobile application may be associated with a merchant operating a merchant computer 104. When the user has selected goods or services via the mobile application, the user may proceed to a checkout process for the transaction. For example, the user may select a "Buy" or "Checkout" option presented on a display of the user computing device 102.

In step 2, the mobile application sends a transaction message to a merchant computer 104 regarding the transaction initiated by the user. The mobile application may include user data, user computing device data, and transaction data in the transaction message. In some embodiments, the user may access a merchant website stored on the merchant computer 104 (e.g., a merchant web server computer) using an Internet browser stored on the user computing device 102.

In step 3, the merchant computer 104 receives the transaction message including the user data, user computing device data, and transaction data for the transaction. The merchant computer 104 may generate an authentication request message for the transaction. The data in the authentication request message may include user computing device data (e.g., operating system data, browser data, mobile application data, geo-location data), user data (e.g., user name, user address data, user email address, user phone number), and transaction data (e.g., shopping cart data, payment device data, payment account number), and/or other comparable data. The merchant computer 104 may then send the authentication request message across a secure connection to the directory server computer 106.

In some embodiments, the mobile application on the user computing device 102 may generate the authentication request message on behalf of the merchant computer 104, and send the generated authentication request message to the merchant computer 104. In some embodiments, the mobile application stored on the user computing device 102 may store all the data for the merchant within the mobile application. In such embodiments of the present invention, software and data libraries associated with the secure authentication process may be integrated into the mobile application stored on the user computing device 102. In such embodiments, the software, application programming interfaces, and data libraries may enable the mobile application to generate and format the authentication request message. The mobile application may also store software components for a merchant plug-in module, which may act as a proxy for re-directing the user computing device 102 to the web address (or URL) of the directory server computer 106 and/or the access control server computer 108.

In step 4, the directory server computer 106 may route the authentication request message to an appropriate access control server computer 108 associated with the received payment device data. For example, the directory server computer 106 may evaluate the data in the authentication request message and search for an account range that includes a bank identification number ("BIN") or personal account number ("PAN") received in the authentication request message.

In step 5, the access control server computer 108 may receive the authentication request message from the directory server computer 106. The access control server computer 108 may then perform an enrollment verification process and a risk analysis using the data received in the authentication request message.

In some embodiments, as part of the enrollment verification process, the access control server computer 108 may determine whether an account identifier (e.g., an account number) has been previously enrolled in the secure authentication program provided by the access control server computer 108. The access control server computer 108 may contain or have access to a database which stores enrolled account identifiers. In some embodiments, authentication may be available for the payment device used in the transaction when a bank identification number (BIN) associated with the payment device is within a BIN range provided by an issuer (e.g., bank). In some embodiments, when the account identifier is not enrolled in the secure authentication program, the access control server computer 108 may not perform an authentication for the transaction and return an authentication response message indicating that no authentication process was performed.

In some embodiments, when the account identifier is enrolled in the secure authentication program, the access control server computer 108 may perform a risk analysis using the user data, user computing device data, and transaction data received in the authentication request message. In some embodiments, the risk analysis may include analyzing previous transactions associated with the payment device, an account identifier and/or the user computing device data. In some embodiments, the risk analysis may return a risk score associated with the transaction. The access control server computer 108 may evaluate the risk score against a pre-established risk threshold.

When the risk score is on a first side of the threshold (e.g., below the threshold), the transaction may be deemed to be low risk. In such situations, the access control server computer 108 may not require any interaction with the user or the user computing device for additional authentication data. In some embodiments, where the risk score indicates that the transaction is low risk, steps 5 and 6 may not be required. For example, given a risk analysis where the risk score is within a range from 0-10, with 10 being the highest likelihood of fraud and 0 being the lowest likelihood of fraud, a risk score of 5 may be established as a risk threshold. In such situations, where the risk score determined from the risk analysis is between 0 and 4, the transaction may be considered low risk, and the process may proceed to step 10 for generation and sending of a verification value.

However, when the risk score is on a second side of the threshold (e.g., above the threshold), the transaction may be deemed to be high risk. In such situation, the access control server computer 108 may require additional data from the user associated with the user computing device 102 in order to authenticate the transaction. Using the example above, where the risk score determined from the risk analysis is between 5 and 10, the transaction may be considered high risk, and the process may continue to step 5 for further authentication processes (e.g., a challenge process).

In some embodiments, the enrollment verification process and the risk analysis using the data received in the authentication request message may be performed by the directory server computer 106 on behalf of the access control server computer 108. In some embodiments, the risk score determined by the risk analysis by the directory server computer 106 may then be sent to the access control server computer 108 for further authentication decisioning.

In step 6, when the access control server computer 108 requires additional data to authenticate the transaction, the access control server computer 108 may initiate a challenge process with the user. In some embodiments, the access control server computer 108 may generate an authentication response message indicating that the challenge process is required to authenticate the transaction. In such embodiments, the authentication response message may include a data field indicating the challenge process. For example, the authentication response message may have a PAN Authentication Available data field set to "C" to indicate the challenge process is required. The authentication request message may then be sent to the merchant computer 104 associated with the transaction via the directory server computer 106.

In step 7, the merchant computer 104 sends the authentication response message to the mobile application stored on the user computing device 102. In some embodiments, a merchant plug-in module stored at the merchant computer 104 may modify the authentication response message to include a web address (e.g., URL). The web address may be used to re-direct the user computing device 102 to the access control server computer 108 (or the directory server computer 106) for performance of the challenge process.

In step 8, the user computing device 102 may be re-directed to the access control server computer 108 using the web address provided in the authentication response message from the merchant computer 104. In some embodiments, the browser or the mobile application on the user computing device 102 may be re-directed to the access control server computer 108. In some embodiments, the user computing device 102 may send a message to the access control server computer 108 to request a challenge request message.

In step 9, the access control server computer 108 may generate and send a challenge request message to the user computing device 102. The challenge request message may request that the user associated with the user computing device provide a pre-established secure data element (e.g., password, token or biometric data). The challenge request message may be presented to the user on the display of the user computing device as a web interface sent across a communications network (e.g., Internet), or may be sent to the consumer via other types of communications (e.g., SMS messaging, email messaging). In some embodiments, the challenge request message may be sent directly from the access control server computer 108 to the user computing device 102. In other embodiments, the challenge request message may be sent to the user computing device 102 through the directory server computer 106. The challenge request message may be sent through the secure connection established by the mobile application.

In step 10, the user computing device 102 returns a challenge response message to the access control server computer 108. The challenge response message may include the secure data element request by the access control server computer 108 in the challenge request message. In some embodiments, the challenge response message may be sent directly to the access control server computer 108 from the user computing device 102. In other embodiments, the challenge response message may be sent from the user computing device 102 to the access control server computer 108 through the directory server computer 106. The access control server computer 108 may evaluate the received secure data element against the pre-established secure data element stored by the access control server computer 108. When the received secure data element and the stored secure data element match or are within an expected range, the transaction may be authenticated. In some embodiments, the challenge response message may be sent to the access control server computer 108 from the user computing device 102 through the merchant computer 104 and/or the directory server computer 106.

In some embodiments, steps 8 and 9 may be repeated until either the number of times the secure data element can be requested from the user computing device 102 is exceeded, the access control server computer 108 successfully authenticates the user and generates the verification value, or the authentication is determined to be unsuccessful and the access control server computer 108 generates the authentication response message indicating a failed authentication.

In step 11, the access control server computer 107 may generate and send an authentication response message to the directory server computer 106. The generated authentication response message may include a verification value for the transaction generated in response to a successful authentication. In some embodiments, the verification value may be a card authentication verification value ("CAVV"). This value can be a cryptogram that has any suitable number of characters (e.g., 3-10). The directory server computer 106 may then route the authentication response message back to the merchant computer 104 associated with the transaction.

In some embodiments, where the challenge process was required for the transaction and successfully completed, the verification value may be sent to the merchant computer 104 in a challenge result message. The challenge result message may be sent to the merchant computer 104 in a similar manner as the authentication response message.

In step 12, the merchant computer 104 may receive the authentication response message (or challenge result message) including the verification value from the directory server computer 106. The merchant computer 104 may then generate an authorization request message for the transaction. The authorization request message may include transaction data, payment data, and the verification value generated by the access control server computer 108. The merchant computer 104 may send the authorization request message to an acquirer computer 112 associated with an account of the merchant. The acquirer computer 112 may then send the authorization request message to the access control server computer 108 via a payment processing server computer 114. In such embodiments, the access control server computer 108 may be associated with an issuer computer of the user account provided by the user for the transaction. In other embodiments, the authorization request message may be sent to an issuer computer separate from the access control server computer 108. The access control server computer 108 may determine whether the transaction should be authorized or declined by evaluating account details (e.g., account balance, transaction velocity). The access control server computer 108 may then generate an authorization response message indicating that the transaction has been authorized or rejected. The authorization response message may be sent back to the merchant computer via the payment processing server computer 114 and the acquirer computer 112.

In step 13, based on the result of the authorization process, the merchant computer 104 may proceed and finalize the transaction, or may end the transaction. The merchant computer 104 may finalize the transaction by providing goods or services to the user.

In step 14, data for the authentication process may be stored in the authentication history server 114. The authentication history server 114 may store data received in the authentication request message and data indicating the result of the authentication process performed by the directory server computer 106 and the access control server computer 108.

Figure 2:
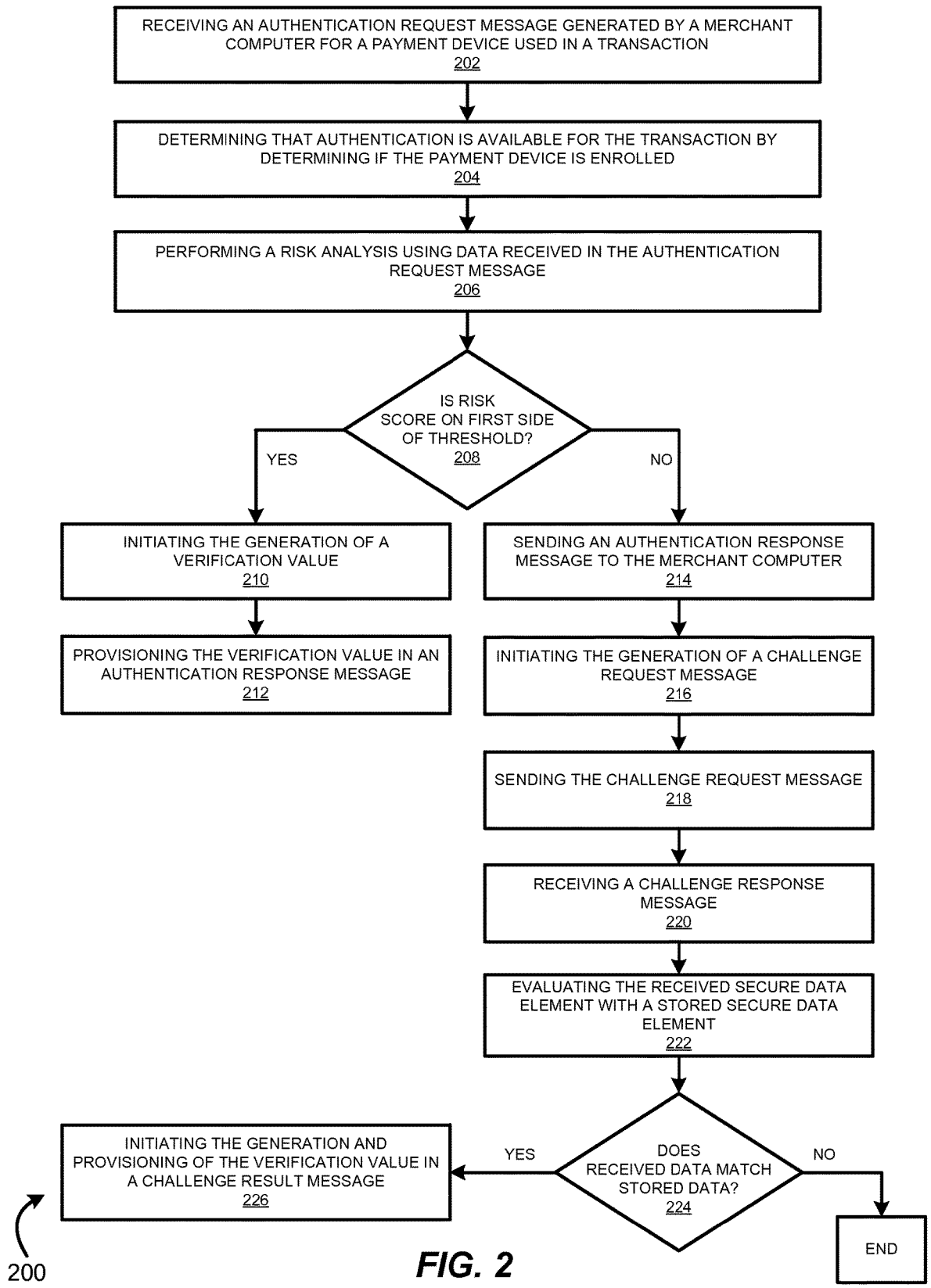
FIG. 2 shows a flowchart describing a method of authenticating a transaction in a secure environment according to an embodiment of the present invention.

FIG. 2 shows a flowchart describing a method of authenticating a transaction in a secure environment according to an embodiment of the present invention.

In step 202, the server computer receives an authentication request message generated by a merchant computer 104 for a payment device used in a transaction between a user and a merchant. The authentication request message may include user data, user computing device data, and transaction data. In some embodiments, the transaction may be a purchase transaction. The server computer may receive the authentication request from the merchant computer 104 associated with the merchant. In some embodiments, the server computer may be a directory server computer 106. In other embodiments, the server computer may be an access control server computer 108.

In step 204, the server computer determines if authentication is available for the transaction by determining whether the payment device is enrolled in a secure authentication program. In some embodiments, whether the payment device is enrolled in the secure authentication program may be based on determining whether an account identifier associated with the payment device is enrolled in the secure authentication program. For example, the server computer may determine whether the account identifier (e.g., BIN, PAN) is an account identifier that has been enrolled in the secure authentication program. In some embodiments, enrollment may be performed by the user or by the issuer of a payment device associated with the account identifier.

In step 206, the server computer performs a risk analysis using the user data, the user computing device data, and the transaction data received in the authentication request message to compute a risk score. The risk score may be determined based on the data received in the authentication request message and data retrieved from an authentication history server computer 110 from previous authentication processes involving the account identifier. In some embodiments, the risk analysis may include analyzing previous transactions associated with the payment device, an account identifier and/or the user computing device data.

In step 208, the server computer determines whether the risk score determined from the risk analysis is on a first side of a threshold. Once the risk score has been determined by the server computer, the risk score is compared against a pre-established risk threshold to determine whether the risk score exceeds a risk level established by the issuer.

In step 210, when the risk score is on the first side of the threshold, the server computer initiates generating a verification value. In some embodiments, when the risk score is on the first side of the threshold (e.g., below the threshold), the transaction may be deemed not risky. In such embodiments, the server computer may initiate the generation of a verification value for the payment device to be used in the transaction.

In step 212, the server computer initiates provisioning the verification value to the user computing device 102 in an authentication response message. The server computer may initiate the process of sending the verification value to the merchant computer 104 by generating the authentication response message and/or by providing the instructions for generating the authentication response message.

In step 214, the server computer sends an authentication response message to the merchant computer 104 indicating a challenge process is required. The authentication response message may include a field indicating the need for the challenge process to be performed before the transaction can be authenticated. The server computer may send the indication of the challenge process by generating the authentication response message and/or by providing the instructions for generating the authentication response message.

In step 216, the server computer initiates generating a challenge request message. In some embodiments, when the risk score is on the second side of the threshold (e.g., above the threshold), the transaction may be deemed higher risk. In such embodiments, the server computer may initiate the generation of a challenge request message. The challenge request message may request that a secure data element be provided by the user. Examples of secure data elements include a password, a token, and/or biometric data.

In step 218, the server computer sends the challenge request message to the user computing device 102. The challenge request message may be sent to the user computing device 102 by a direct connection between the user computing device 102 and the server computer.

In step 220, the server computer receives a challenge response message from the user computing device 102. The challenge response message may include the secure data element provided by a user associated with the user computing device 102.

In step 222, the server computer evaluates the received secure data element against a stored secure data element. The server computer may evaluate the received secure data element to determine whether the received secure data element matches or is within a range of a stored secure data element. The stored secure data element may have been stored by the server computer during an enrollment process previously performed for the account identifier.

In step 224, the server computer determines whether the received secure data element matches or is within a range of a stored secure data element. In some embodiments, when the received secure data element does not match the stored secure data element or is not within the range of the stored secure data element, the authentication process may terminate and the server computer may provide an indication in the authentication response message that authentication was unsuccessful. In other embodiments, additional authentication processes may be performed to authenticate the transaction.

In step 226, when the received secure data element matches a stored secure data element, the transaction is authenticated by the server computer. In such situations, the process proceeds to the generation of a verification value and the provision of the verification value to the merchant computer 104 in a challenge result message. The server computer may send the verification value by generating the challenge result message and/or by providing the instructions for generating the challenge result message.

III. Technical Benefits

Embodiments of the present invention provide a number of advantages and technical benefits. For example, embodiments of the present invention provide the benefit of minimizing the messages that are required in order to perform an authentication process. Rather than performing enrollment verification and then a payment authentication step, each using separate message pairs, embodiments of the present invention may perform the entire authentication process using a single message pair.

Further, unlike previous solutions, as a risk assessment is performed based on the data received in the authentication request message, the challenge process that requires user interaction (e.g., providing a password, token, or biometric data) may only be required when there is a high risk associated with the payment device, rather than for every transaction. This results in the use fewer resources and results in less network congestion than would be required through having to perform the enrollment verification process and the payment authentication process using two message pairs.

In addition, performing a risk analysis provides the benefit of greater confidence that a payment device and/or user are authentic. Even performing the payment authentication step requiring a user password could be susceptible to fraud if a third party comes into possession of the user password. However, the risk analysis is based on a plurality of data points including user data, payment device data, user computing device data, transaction data, geolocation data, and other comparable data, and thus may have greater reliability at preventing unauthorized transactions.

Another benefit provided by embodiments of the present invention is that the messages and the data sent as part of the secure authentication program have to travel over fewer networks. In locations where the data or communications networks are not as reliable, such as in developing countries, conducting the secure authentication process in fewer steps reduces the risk that the process may be lost, interrupted, or slowed by unreliable networks.

Additional benefits may be provided by embodiments of the present invention. For example, by re-directing the browser on the user computing device to the directory server computer, a session may be opened between the access control server computer and the user computing device, which allows the access control server computer access to additional user computing device data that would otherwise not be readily accessible. Typically, this data would not be retrieved by a merchant plug-in associated with a merchant computer as it would require the merchant to modify its transaction infrastructure.

IV. Exemplary Apparatuses

Figure 3:
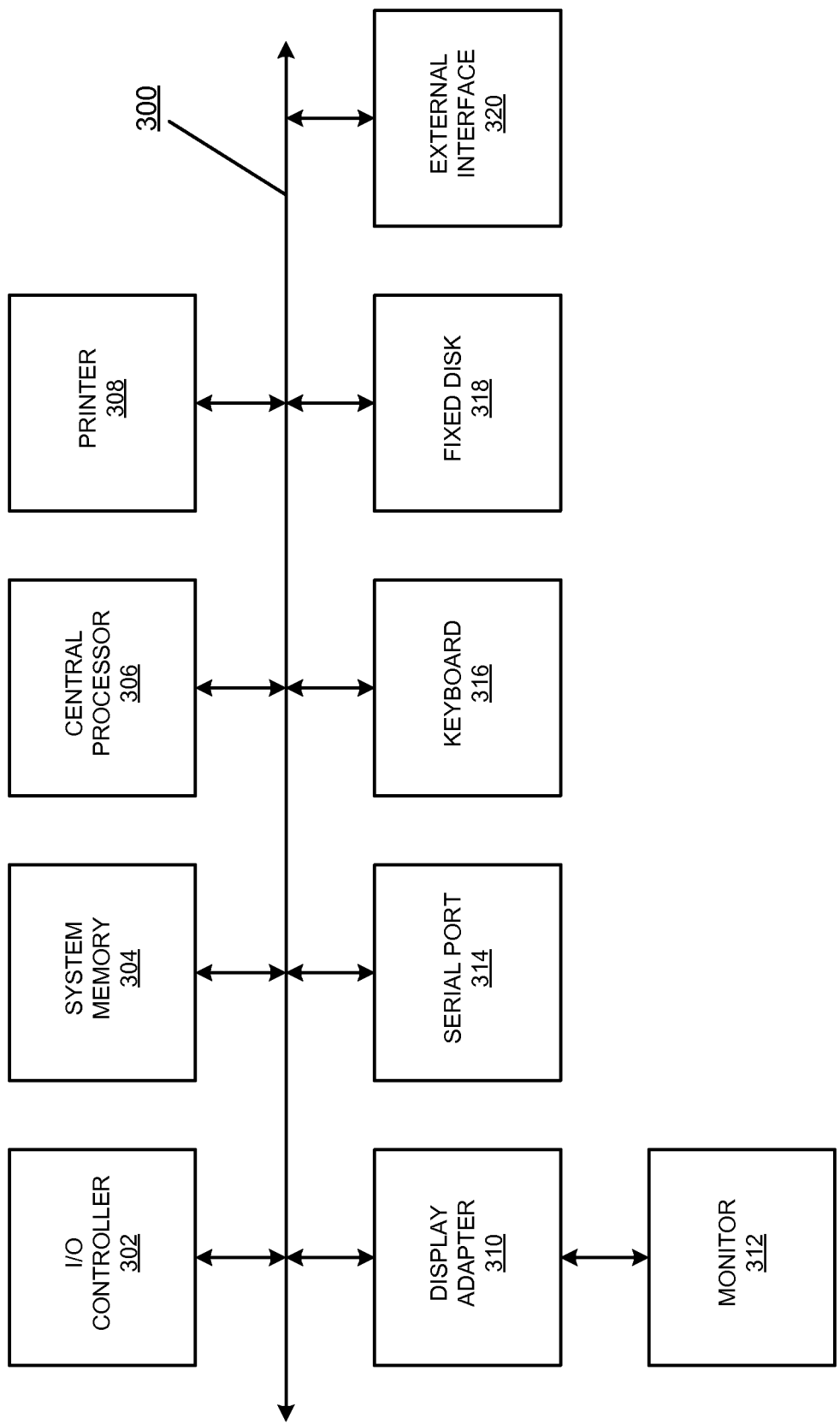
FIG. 3 shows a block diagram of a computer apparatus according to an embodiment of the invention.

Examples of such subsystems or components are shown in FIG. 3. The subsystems shown in FIG. 3 are interconnected via a system bus 300. Additional subsystems such as a printer 308, keyboard 314, fixed disk 316 (or other memory comprising computer readable media), monitor 320, which is coupled to display adapter 310, and others are shown. Peripherals and input/output (I/O) devices, which couple to I/O controller 302 (which can be a processor or other suitable controller), can be connected to the computer system by any number of means known in the art, such as serial port 312. For example, serial port 312 or external interface 318 can be used to connect the computer apparatus to a wide area network such as the Internet, a mouse input device, or a scanner. The interconnection via system bus allows the central processor 306 to communicate with each subsystem and to control the execution of instructions from system memory 304 or the fixed disk 316, as well as the exchange of information between subsystems. The system memory 304 and/or the fixed disk 216 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

Any recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by an access control server computer, an authentication request message from a merchant computer for a payment device used in a transaction between a user and a merchant associated with the merchant computer, the authentication request message including user data, user computing device data associated with a user computing device used in the transaction including a unique device identifier, and transaction data for the transaction;
determining, by the access control server computer, that the payment device is enrolled in an authentication program based at least in part on the user computing device data;
receiving, by the access control server computer and from a directory server computer, data identifying previous authentication processes of an authentication program that is associated with the user computing device, the data identifying previous authentication processes retrieved from an authentication history server in response to a query by the directory server computer, the previous authentication processes comprising previous challenge request messages and previous challenge response messages associated with the user computing device that correspond to previous transactions and that involve the use of a particular secure data element, the particular secure data element associated with the previous transactions;
performing, by the access control server computer, a risk analysis using the user data, the user computing device data, the transaction data received in the authentication request message, and the data identifying previous authentication processes to compute a risk score based at least in part in determining that authentication is available for the transaction, the data identifying previous authentication processes including information indicating a type of the particular secure data element, a result of a matching between the particular secure data element and a stored data element, the stored data element stored in the directory server computer, and a number of attempts to authenticate utilizing the particular secure data element during the previous authentication processes;
transmitting, by the access control server computer and to the merchant computer, an indication that a challenge process that includes a challenge request message is required based at least in part on the risk score and a threshold associated with the transaction;
receiving, by the access control server computer and from the user computing device, a request for the challenge request message via a web address provided by the merchant computer to the user computing device in response to the indication;
transmitting, by the access control server computer and to the user computing device, the challenge request message in response to the user computing device being redirected to the access control server computer via the web address included in a modified authentication response message transmitted to the user computing device by the merchant computer;
receiving, by the access control server computer and from the user computing device, a challenge response message that corresponds to the challenge request message, the challenge response message including the particular secure data element;
evaluating, by the access control server computer, the particular secure data element against the stored data element to determine if the particular secure data element matches within a certain range of the stored data element;
provisioning, by the access control server computer and to the merchant computer, a verification value in the authentication response message in response to receiving the challenge response message and evaluating the particular secure data element, the merchant computer configured to use the verification value in generating an authorization request message for the transaction;
receiving, by the access control server computer and from the merchant computer, the authorization request message for the transaction, the authorization request message including the verification value;
determining, by the access control server computer, to authorize the transaction based at least in part on the authorization request message and the verification value; and
transmitting, by the access control server computer and to the merchant computer, an authorization response message authorizing the transaction.

2. The method of claim 1, wherein the authentication request message is generated by the merchant computer.

3. The method of claim 1, wherein performing the risk analysis further comprises using the previous transactions associated with the payment device to compute the risk score.

4. The method of claim 1, wherein the challenge response message includes the particular secure data element, the particular secure data element including one or more of a password or a token.

5. The method of claim 1, wherein determining that authentication is available for the transaction further comprises:
determining, by the access control server computer, that a bank identification number associated with the payment device is within a bank identification number range provided by an issuer computer.

6. The method of claim 1, wherein the authentication request message is generated by an application stored on the user computing device.

7. The method of claim 1, wherein the transaction is a purchase transaction.

8. The method of claim 1, wherein the verification value is sent from the merchant computer to a payment processing server computer as part of an authorization process for the transaction.

9. An access control server computer comprising:
a processor; and
a tangible non-transitory computer readable medium coupled to the processor, the tangible non-transitory computer readable medium comprising code, executable by the processor for implementing a method comprising:
receiving an authentication request message from a merchant computer for a payment device used in a transaction between a user and a merchant associated with the merchant computer, the authentication request message including user data, user computing device data associated with a user computing device used in the transaction including a unique device identifier, and transaction data for the transaction;
determining that the payment device is enrolled in an authentication program based at least in part on the user computing device data;

receiving, from a directory server computer, data identifying previous authentication processes of an authentication program that is associated with the user computing device, the data identifying previous authentication processes retrieved from an authentication history server in response to a query by the directory server computer, the previous authentication processes comprising previous challenge request messages and previous challenge response messages associated with the user computing device that correspond to previous transactions and that involve the use of a particular secure data element, the particular secure data element associated with the previous transactions;

performing a risk analysis using the user data, the user computing device data, the transaction data received in the authentication request message, and the data identifying previous authentication processes to compute a risk score based at least in part on determining that the payment device is enrolled in the authentication program, the data identifying previous authentication processes including information indicating a type of the particular secure data element, a result of a matching between the particular secure data element and a stored data element, the stored data element stored in the directory server computer, and a number of attempts to authenticate utilizing the particular secure data element during the previous authentication processes;

transmitting, to the merchant computer, an indication that a challenge process that includes a challenge request message is required based at least in part on the risk score and a threshold associated with the transaction;

receiving, from the user computing device, a request for the challenge request message via a web address provided by the merchant computer to the user computing device in response to the indication;

transmitting, to the user computing device, the challenge request message in response to the user computing device being redirected to the access control server computer via the web address included in a modified authentication response message transmitted to the user computing device by the merchant computer;

receiving, from the user computing device, a challenge response message that corresponds to the challenge request message, the challenge response message including the particular secure data element;

evaluating the particular secure data element against the stored data element to determine if the particular secure data element matches within a certain range of the stored data element;

provisioning, to the merchant computer, a verification value in the authentication response message in response to receiving the challenge response message and evaluating the particular secure data element, the merchant computer configured to use the verification value in generating an authorization request message for the transaction;

receiving, by the access control server computer and from the merchant computer, the authorization request message for the transaction, the authorization request message including the verification value;

determining, by the access control server computer, to authorize the transaction based at least in part on the authorization request message and the verification value; and transmitting, by the access control server computer and to the merchant computer, an authorization response message authorizing the transaction.

10. The access control server computer of claim 9, wherein the authentication request message is generated by the merchant computer.

11. The access control server computer of claim 9, wherein performing the risk analysis further comprises using the previous transactions associated with the payment device to compute the risk score.

* * * * *